(12) United States Patent
O Connor et al.

(10) Patent No.: US 6,643,576 B1
(45) Date of Patent: Nov. 4, 2003

(54) RAPID ADJUSTMENT OF TRAJECTORIES FOR LAND VEHICLES

(75) Inventors: Michael L. O Connor, Redwood City, CA (US); Thomas Bell, Bernville, PA (US); Michael L. Eglington, Palo Alto, CA (US); Lars Leckie, Redwood City, CA (US); Gregory M. Gutt, Lexington Park, MD (US); Kurt R. Zimmerman, Mountain View, CA (US)

(73) Assignee: IntegriNautics Corporation, Menlo Park, CA (US)

( * ) Notice: Subject to any disclaimer, the term of this patent is extended or adjusted under 35 U.S.C. 154(b) by 0 days.

(21) Appl. No.: 09/993,361

(22) Filed: Nov. 15, 2001

Related U.S. Application Data

(60) Provisional application No. 60/249,108, filed on Nov. 15, 2000.

(51) Int. Cl.[7] .................................................. G06F 7/00
(52) U.S. Cl. .......................................................... 701/50
(58) Field of Search ............................ 701/50, 23, 205, 701/207, 213, 224

(56) References Cited

U.S. PATENT DOCUMENTS

| | | | |
|---|---|---|---|
| 5,615,116 A | 3/1997 | Gudat et al. | |
| 5,646,843 A | 7/1997 | Gudat et al. | |
| 5,657,226 A | 8/1997 | Shin et al. | |
| 5,684,696 A | 11/1997 | Rao et al. | |
| 5,752,207 A | 5/1998 | Sarangapani | |
| 5,987,371 A | 11/1999 | Bailey et al. | |
| 5,987,383 A | 11/1999 | Keller et al. | |
| 5,994,865 A | 11/1999 | Phelps et al. | |
| 6,041,870 A | 3/2000 | Zimmerman et al. | |
| 6,052,647 A | 4/2000 | Parkinson et al. | |
| 6,062,317 A | 5/2000 | Gharsalli et al. | |
| 6,064,926 A | 5/2000 | Sarangapani et al. | |
| 6,085,130 A | 7/2000 | Brandt et al. | |
| 6,099,236 A | 8/2000 | Wiechman | |
| 6,129,155 A | 10/2000 | Lombardi | |
| 6,173,215 B1 | 1/2001 | Sarangapani | |
| 6,185,493 B1 | 2/2001 | Skinner et al. | |
| 6,205,381 B1 | 3/2001 | Motz et al. | |
| 6,236,916 B1 | 5/2001 | Staub et al. | |
| 6,236,924 B1 | 5/2001 | Motz et al. | |
| 6,286,606 B1 | 9/2001 | Krieg et al. | |
| 6,295,746 B1 | 10/2001 | Meduna et al. | |

Primary Examiner—Yonel Beaulieu
(74) Attorney, Agent, or Firm—Dorsey & Whitney LLP

(57) ABSTRACT

A method for adjusting a desired trajectory of an automatically guided vehicle guidance system to match a physical constraint such as an obstacle or boundary. The method works around obstacles and boundaries as they occur, consistent with the original trajectory. The method is independent of the type of vehicle. The method may be used regardless of whether the vehicle is under automatic guidance, and the method has a low computational cost.

21 Claims, 5 Drawing Sheets

RAPID ADJUSTMENT OF TRAJECTORIES FOR LAND VEHICLES

BENEFIT APPLICATIONS

This application claims the benefit of the following application:

U.S. Provisional Patent Application No. 60/249,108, entitled, "Method for the Rapid Adjustment of Trajectories for Land Vehicles," filed Nov. 15, 2000, naming Michael L. O'Connor and Thomas Bell as inventors, and under an obligation of assignment to IntegriNautics, Inc. of Menlo Park, Calif.

U.S. Provisional Patent Applications No. 60/249,108 is incorporated by reference herein.

The invention generally relates to operator control of autonomous heavy machinery and specifically to methods for human operators to use autonomous vehicles in agriculture, construction, and open-pit mining.

BACKGROUND

A significant amount of work has been done to improve the efficiency of heavy machinery in areas such as agriculture, construction, and open-pit mining. In particular, some efforts strive to improve effectiveness of the equipment by providing very accurate position information to the driver or even automatically steering the vehicle.

Most prior art does not explain what the operator should do when an unplanned obstacle or boundary is encountered. Some approaches strive for complete autonomy, with no human operator, in which case a variety of sensors are directed to try to handle atypical situations. Others propose a combination of autonomous, semi-autonomous, and manual modes of operation, without describing ways for the operator to interact with the system to achieve specific results.

Parkinson et al., U.S. Pat. No. 6,052,647, "Method and System for Automatic Control of Vehicles Based on Carrier Phase Differential GPS," describes an auto control system for a land vehicle based on carrier phase differential GPS for position and heading sensing.

Gudat et al., U.S. Pat. No. 5,646,843, "Apparatus and Method for Surface Based Vehicle Control System," and Gudat et al., U.S. Pat. No. 5,615,116, "Apparatus and Method for Autonomous Vehicle Navigation Using Path Data," discuss auto control of a land vehicle with distinct operating modes and path following. Simple methods for switching between autonomous and manual modes are described but are different from the invention described herein. Obstacle avoidance operates purely autonomously. Neither disclosure describes a way for the operator to make corrections to the auto guidance plan without switching to manual mode.

The following patents relate to automatic path planning and trajectory following but do not discuss a user interface or a method for the user to adjust the trajectories:

Brandt et al., U.S. Pat. No. 6,085,130, "Method and Apparatus for Selecting a Transition Scheme for Use in Transitioning a Mobile Machine from a First Path to a Second Path" relates to a transition from one path to another path, presumably under complete autonomy.

Zimmerman et al., U.S. Pat. No. 6,041,870, "Method and Apparatus for Steering a Dozing Machine," describes actuation of a dozer blade to laterally adjust the centerline of the vehicle.

Keller et al., U.S. Pat. No. No. 5,987,383, "Form Line Following Guidance System," covers a method for automatically generating paths.

Rao, U.S. Pat. No. 5,684,696, "System and Method for Enabling an Autonomous Vehicle to Track a Desired Path," describes generation of a desired trajectory based on current location and desired trajectory.

Sarangapani et al., U.S. Pat. No. 6,064,926, "Method and Apparatus for Determining an Alternate Path in Response to Detection of an Obstacle," Sarangapani, U.S. Pat. No. 6,173,215, "Method for Determining a Desired Response to Detection of an Obstacle," and Sarangapani, U.S. Pat. No. 5,752,207, "Method and Apparatus for Determining a Path for a Machine between a Predetermined Route and a Final Position," all describe automatic path planning and obstacle avoidance.

Motz et al., U.S. Pat. No. 6,236,924, "System and Method for Planning the Operations of an Agricultural Machine in a Field," describes a path planning method.

The following patents pertain to vehicle control:

Motz et al., U.S. Pat. No. 6,205,381, "System and Method for Planning the Operations of an Agricultural Machine in a Field," relates to coordination of multiple vehicles under automatic control.

Staub et al., U.S. Pat. No. 6,236,916, "Autoguidance System and Method for an Agricultural Machine," relates to general auto control of farm tractors.

Gharsalli et al., U.S. Pat. No. 6,062,317, "Method and Apparatus for Controlling the Direction of Travel of an Earthworking Machine," relates to control systems for construction scraper.

Sin et al., U.S. Pat. No. 5,657,226, "System and Method for Causing an Autonomous Vehicle to Track a Path," relates to general auto control of farm tractor.

SUMMARY

Herein is taught a method for adjusting a desired trajectory of an automatically guided vehicle guidance system to match a physical constraint such as an obstacle or boundary. The method works around obstacles and boundaries as they occur, consistent with the original trajectory. The method is independent of the type of vehicle. The method may be used regardless of whether the vehicle is under automatic guidance, and the method has a low computational cost.

Figure 1:
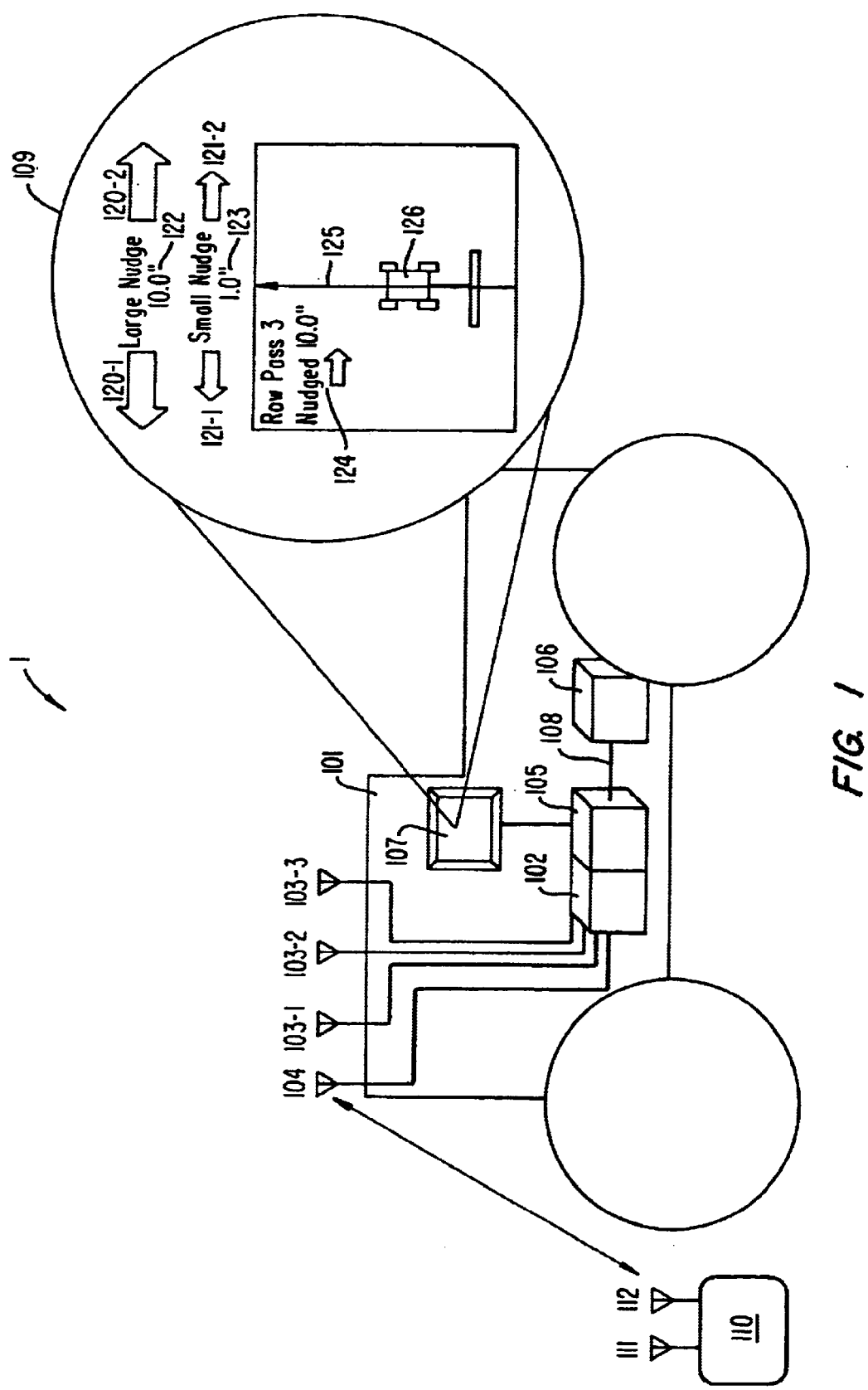
FIG. 1 illustrates a system (1) incorporating an embodiment of the invention.

(Some of the drawings are not to scale.)

DESCRIPTION OF THE INVENTION

FIG. #_1 illustrates a system (1) incorporating an embodiment of the invention. The system (1) may include a farm tractor (101) and a local global positioning system (GPS) reference station (110).

The farm tractor (101) may have position and heading sensors (102), antennae (103-i), antennae (104), a controller (105), a steering system (106), a touch-screen monitor (107) and a steering signal (108).

The GPS reference station (110) may include an antenna (111) and a transmitter (112).

In this example, the position and heading sensors (102) are based on the Global Positioning System (GPS). Using the local GPS reference station (110) and differential carrier phase methods, the sensors (102) sense the tractor position to inch-level accuracy. (The station (110) and the methods are well known in the art.)

The reference station (110) receives GPS signals at its location via its antenna (111) and sends them via radio modem (112) to the tractor (101) via the tractor's antenna (104). The tractor heading is measured to sub-degree accuracy using three GPS antennas (103-1:103-3), using yet another GPS technique well known in the art.

The controller 105 may be a computer that uses the GPS position and heading information to autonomously steer the tractor (101). The controller(105) generates a nominal trajectory based on field parameters loaded from a database (not shown) or entered by the user through a touch screen monitor (107). The controller (105) runs software that generates a steering signal (108), which is a function of the error between the measured position and heading, on the one hand, and the desired trajectory, on the other. The steering signal (108) is applied to the vehicle's steering system (106), typically either a hydraulic actuator or another controller.

Figure 6:
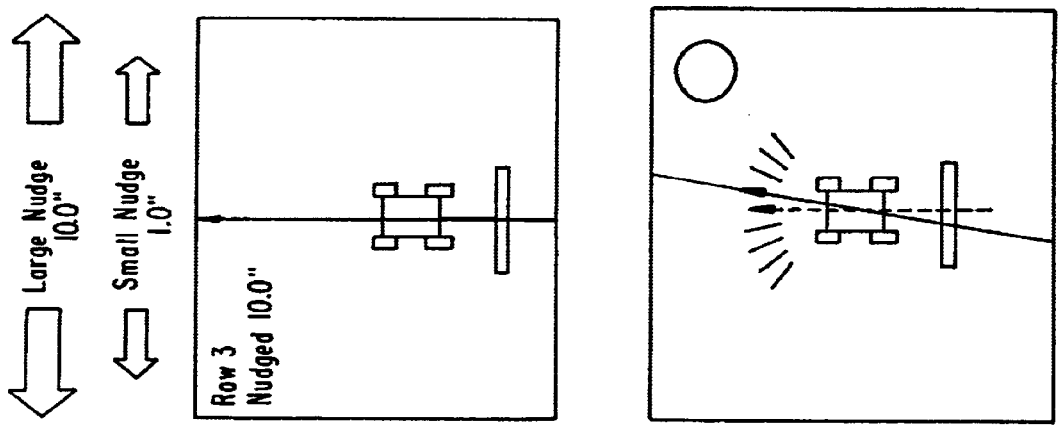
FIG. 6 illustrates various embodiments of a GUI.
Figure 6:
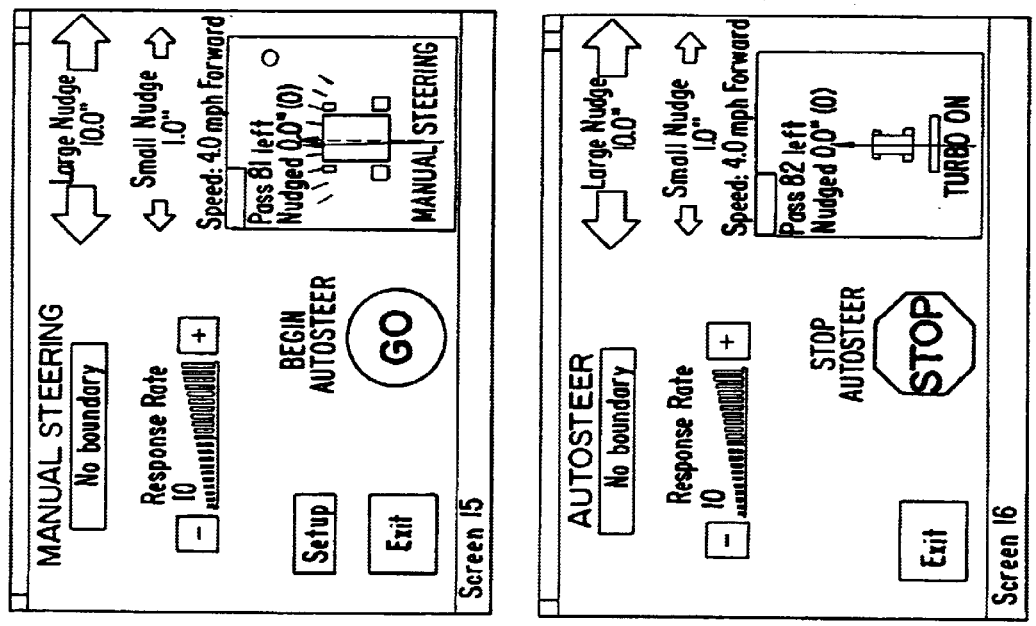

The touch-screen monitor (107) displays a graphical user interface (GUI) (109) controlled by software on the controller (105). The GUI (109) may feature virtual buttons (120-i, 121-j) that enable the user to make discrete lateral offsets (nudges) to the nominal trajectory, even while the tractor (101) is under autonomous steering control. FIG. 6 illustrates various embodiments of a GUI.

A "large" offset may represent one row-width size step (e.g., the space between blades on a plowing implement). A "small" offset may represent a fraction of a row-width. The large (122) or small (123) distance that a respective large or small nudge creates may be shown next to the buttons (120-i, 121-j), and a user may change the distance (122, 123).

An icon (125) representing the tractor and an icon (126) representing the desired trajectory may provide visual feedback to the user of the system state. The cumulative nudge distance and lateral direction (124) may be displayed, as well as the current location on the field (e.g., "Row Pass #3").

Figure 3:
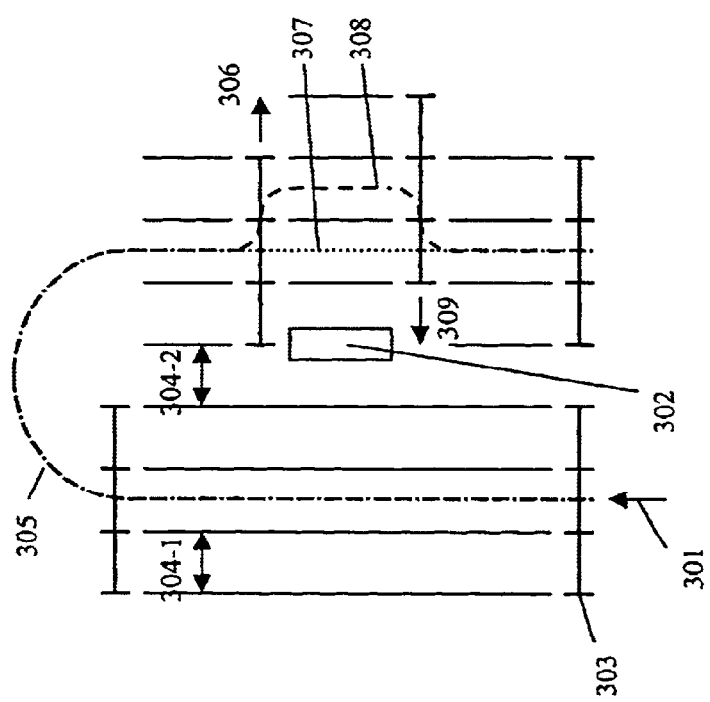
FIG. 3 illustrates an obstacle-avoidance situation.

Applications of the invention to three different situations in farming follow: The first situation is obstacle avoidance, as illustrated by FIG. 3. In this case, an obstacle (302) such as a tree, a water pump, or another piece of equipment may disrupt the continuity of a row or set of rows. Planning for the obstacle (302) at the beginning of the process might require additional time-consuming procedures. Instead, an operator of a vehicle incorporating the invention can handle the situation as it occurs and still maintain consistent alignment of the rows.

Figure 4:
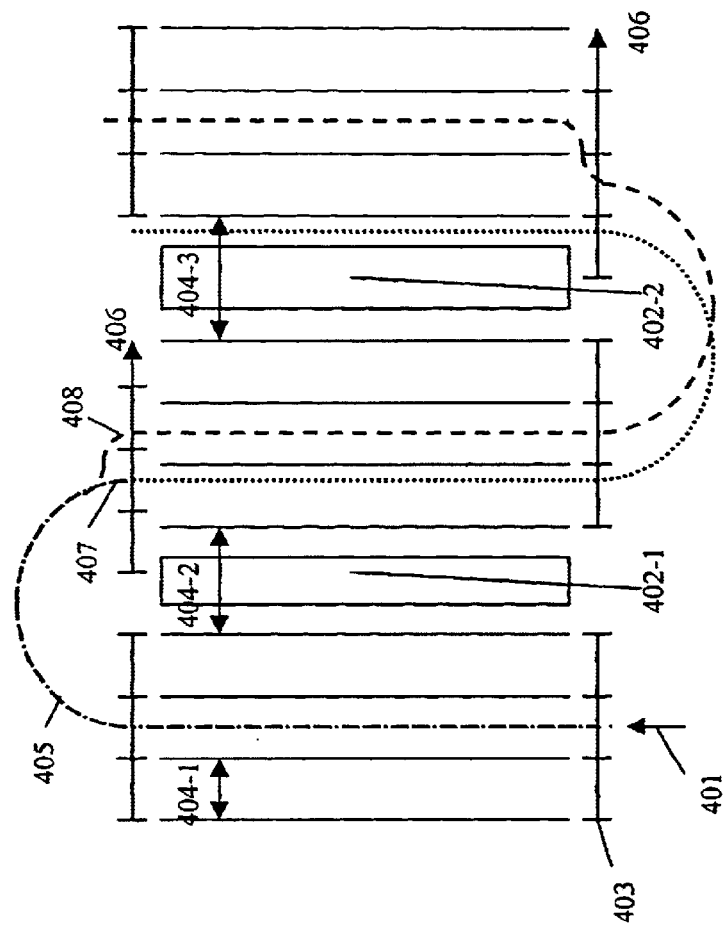
FIG. 4 illustrates a situation involving field discontinuities such as irrigation pipes, ditches or field boundaries.

FIG. 4 illustrates the second situation involving field discontinuities (402-i) such as irrigation pipes, ditches or field boundaries. As in the previous case, planning for such obstacles (402-i) at the beginning of the process might require additional time-consuming procedures. The user may apply nudges that cumulatively result in further offsets from the nominal trajectory (405, dotted line; 407). The nudge events may be stored as part of the trajectory's information for future use.

Figure 5:
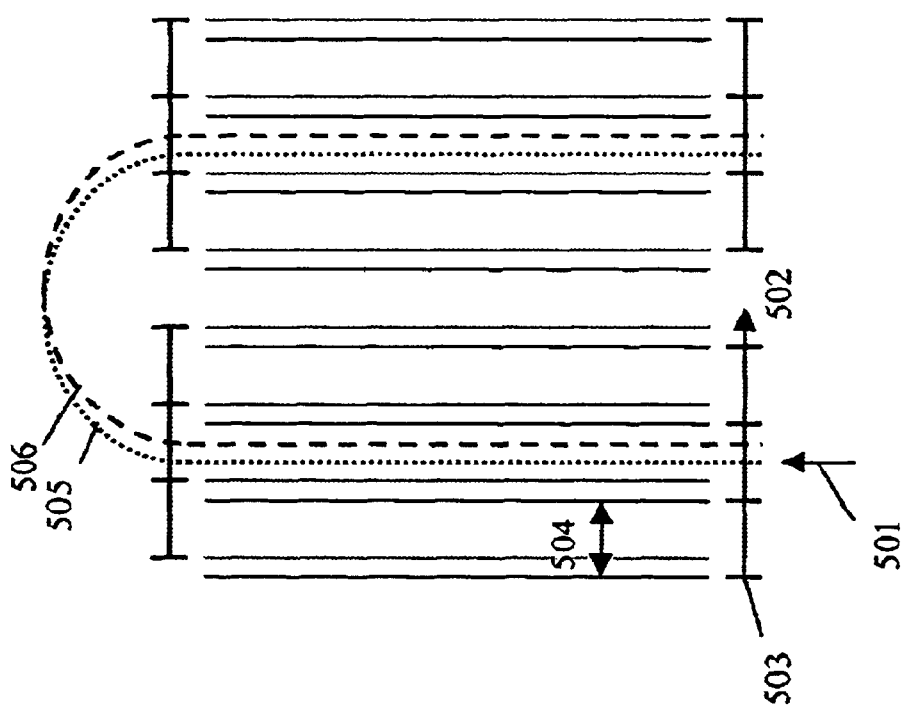
FIG. 5 illustrates a re-trace offsetting situation.

FIG. 5 illustrates the third situation involving re-trace offsetting. In some instances, such as cultivating a crop, it may be desired to re-trace the exact same path (505) that was followed in a prior process, but with a path (506) that is a fraction of a row offset from the original path (505). This may occur if crop growth is laterally offset from the original line due to wind or sun direction. Again, the vehicle operator may use the nudge feature to account for such situations as they occur, without extensive modification to the original trajectory.

Obstacle Avoidance

A tractor (101) is provided with a one or more trajectories by the user or loaded from a database. An automatic guidance system steers the tractor along the first trajectory (301).

The tractor (101) may tow an implement (303), which may create or follow a set of equally spaced rows (304-i). When creating rows, for example, the nominal trajectories (305, dotted line) are equally spaced so that all rows (304-i) are equally spaced, including those between different passes.

In the course of one pass, the vehicle (101) approaches an obstacle (302), preventing the tractor (101) from proceeding along the nominal trajectory (307).

To keep the rows consistent, the user adjusts the trajectory by applying a nudge (306) to the left equal in size to the row spacing, causing the vehicle (101) to follow a new trajectory (308).

Once the obstacle (302) is passed, the user adjusts the trajectory (308) back to the nominal line (307) by applying a nudge (309) to the right equal in size to the row spacing. The nominal line (307) is followed to completion of the pass.

All nudge-button events may be stored as part of the trajectory's information so that the user does not have to readjust the trajectory again at a later date.

Field Discontinuities

A tractor (101) is provided with one or more trajectories by the user or loaded from a database. An automatic guidance system steers the tractor along the first trajectory (401).

The tractor (101) may tow an implement (403), which may create or follow a set of equally spaced rows (404-i). The nominal trajectories (405, dotted line) are equally spaced, and all rows are equally spaced, including those between different passes.

Some rows, however, are disrupted by an irrigation ditch or ground pipe that causes a discontinuity (402-1) in the rows. Such discontinuities (402-i) may not be equally spaced, making them difficult to account for during the initial stage of computing the nominal trajectories (405, dotted line).

The user may apply a left nudge to the nominal trajectory (407) so the vehicle follows the adjusted trajectory (408) rather than the nominal one (407).

The vehicle may encounter another irrigation ditch (402-2). This time, the vehicle is nudged right (406-2), causing a further offset away from the original nominal trajectory (407).

All nudge-button events may be stored as part of the trajectory's information so that the user does not have to readjust the trajectory again at a later date.

Re-trace with Offset

A tractor (101) is provided with one or more original trajectories that were used for a prior process on the field. An automatic guidance system steers the tractor (101) along an original trajectory (501).

The tractor (101) may tow an implement (503), which may create or follow a set of equally spaced rows (504).

The user may recognize that the current process requires a fraction of a row offset from the original trajectory (501). The user applies a small nudge (502) to adjust the original trajectory (505, dotted line) to the new one (506).

As before, nudge-button events may be stored as part of the trajectory's information so that the user does not have to readjust the trajectory again at a later date.

Algorithm to Compute and Apply "Nudge" Offset

Figure 2:
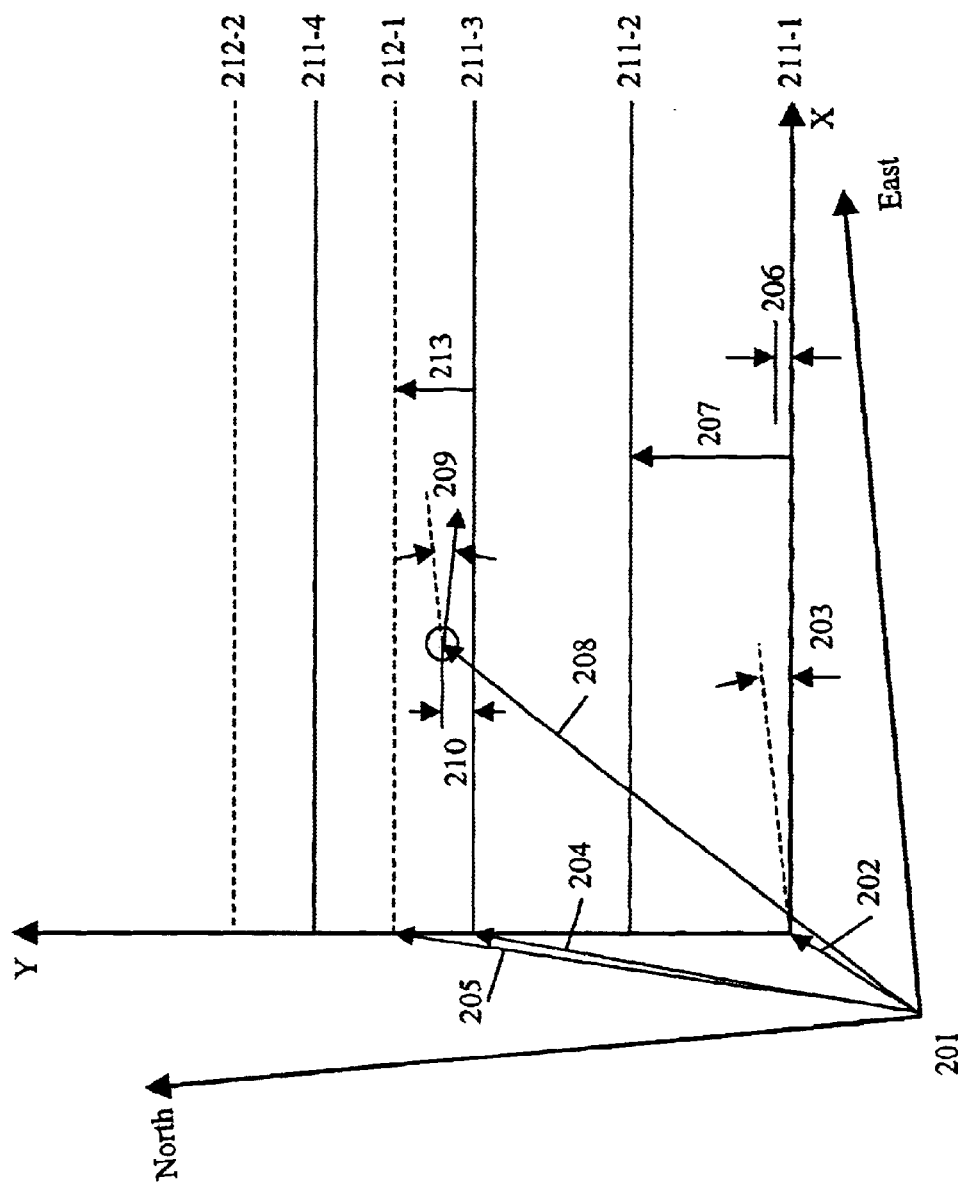
FIG. 2 illustrates an inertial frame and a field within that inertial frame.

The following algorithm describes the adjustment of the trajectory for a tractor plowing a field of nominally evenly spaced rows. The algorithm determines the new trajectory parameters after the user pushes a "nudge" button. The following variables and parameters are defined as they apply to the algorithm:

$P_o$ Field origin in inertial frame, user or database
$\theta_o$ Field direction in inertial frame, user or database
$P_v$ Vehicle Position in inertial frame, as measured by sensor
$\theta_v$ Vehicle Heading in inertial frame, as measured by sensor
$P_k$ Origin for trajectory pass k
$P'_k$ Origin for trajectory pass k after adjustment
M Implement width
S Row spacing
N Nudge Distance
$N_c$ Cumulative Nudge Distance
$N'_c$ Updated Cumulative Nudge Distance
d Sign of the direction of vehicle FIG. 2 illustrates an inertial frame (201) and a field within that inertial frame (201). A field is defined by its origin (202, $P_o$) and direction (203, $\theta$) in the inertial frame (201). The values of the field origin and direction are entered into the system by the user or loaded from a database. In many farming applications, the tractor tows an implement with several teeth or blades that define the row spacing (206, S). A single pass of the tractor covers a swath the width of the implement (207, M), which is some integer number of rows. Both the row spacing (206, S) and implement width (207, M) are parameters that may be defined by the user or loaded from a database.

The nominal trajectory passes are horizontal lines (211-1) in the field frame of reference, whose vertical spacing distance is M. The vehicle is intended to be steered along the trajectory whose origin in the inertial frame is $P_k$, or in the field frame, simply the line y=k*M. The vehicle's position (208, $P_v$) and heading (209, $\theta_v$) in the inertial frame are provided by the appropriate sensors. The effect of pressing the nudge button is to shift the current and subsequent passes by the nudge distance. (The vehicle may not be on the line or heading along the line when the nudge button is pushed.)

The lateral direction to which the nudge is applied depends on the heading (209, θ,) of the vehicle with respect to the field heading at the moment the button is pressed, as well as on which button—left or right, for example—is pressed. A way to compute the sign d of the direction from the measured heading is as follows:

$$d=\text{sign}(\text{mod}(\theta_v-\theta_r+\pi, 2*\pi)/\pi-1)$$

Equivalently, if $-\pi/2<=\theta_v-\theta_r<\pi/2$, the vehicle is headed primarily in the same direction as the field direction, and d=1. Otherwise, the vehicle is headed primarily in the opposite direction of the field, d=-1.

The cumulative nudge distance is initially zero. When the "left nudge" button is pressed, the cumulative nudge distance is incremented by the direction times the Nudge Distance. When the "right nudge" button is pressed, the cumulative nudge distance is decremented by the direction times the Nudge Distance:

left nudge: $N'_c=N_c+d*N$ right nudge: $N'_c=N_c-d*N$

The trajectory pass is adjusted in the field frame so that the new line is y=k*M+$N'_c$, which can then be rotated into the inertial frame:

$$P'_k=P_k+[N'_c*\sin\theta_r]$$

$$[N'_c*\cos\theta_r]$$

The embodiments are by way of example and not limitation. Modifications to the invention as described will be readily apparent to one of ordinary skill in the art. For example, the GUI of an embodiment of the invention may include a Reset button. After the user has nudged the vehicle to avoid an obstacle, the user may un-do the nudging by selecting the Reset button. In response, the guidance system may autonomously undo the cumulative nudge in effect at the time of the selection. The guidance system may, for example, apply nudges that are the inverse in direction and time of the individual nudges that created the cumulative nudge.

The GUI may also include a Pop button. The software maintains as a stack all of the nudges selected by the user. As a nudge is selected and executed, it is placed onto the top of the stack. To undo the last nudge, the user selects the Pop button. In response, the guidance system undoes or reverses the effect of the nudge at the top of the stack and removes ("pops") that nudge from the top of the stack.

Finally, while only a touch-screen monitor displaying a button-based GUI has been described, other input devices are possible. Indeed, any input device of the art for entering information may be adapted for the invention, including switches.

What is claimed is:

1. A system to directly maintain a vehicle on a desired path responsive to user-determined deviation therefrom, the system comprising:

a sensor to determine position of said vehicle as a function of time;

a controller including memory, functionally coupled to said sensor;

said memory storing-positional data defining said desired path, and further storing program instructions, executable by said controller, to compute any change in position of said vehicle and to compute any modifications in realtime to maintain said vehicle on said desired path responsive to any user-determined deviation;

means, coupled to said controller, for maintaining said vehicle according to said any modifications computed by said executable program; and means for enabling a user of said vehicle to-input to said system said user-determined deviation from said desired path, whereupon said system responds to said user-determined deviation from said desired path and maintains said vehicle responsive to said user-determined deviation.

2. The system of claim 1, wherein said responsive to said user-determined deviation comprises directly maintaining said vehicle on a deviation path parallel to said desired path wherein a distance between said deviation path and said desired path is based on said user-determined deviation.

3. The system of claim 2, wherein said user-determined deviation is selected from a group consisting of: a right deviation to move said deviation path to the right, a left deviation to move said deviation path to the left, and a reset deviation to move said deviation path to said desired path.

4. The system of claim 1, wherein said memory further stores positional data including any deviation from said desired path traversed by said vehicle;

wherein positional data stored by said memory is useable to define a new desired path.

5. The system of claim 1, wherein said memory further stores said user-determined deviation with respect to a location on said desired path corresponding to the position of said vehicle when said user-determined deviation was input;

wherein said user-determined deviation stored by said memory is useable to define a new desired path.

6. The system of claim 1, further comprising means for enabling said user of said vehicle to store said user-determined deviation as part of said desired path such that subsequent directly maintain a vehicle on said desired path includes said user-determined deviation without input from said user.

7. The system of claim 1, wherein said user-determined deviation is stored with respect to a location on said desired path corresponding to the position of said vehicle when said user-determined deviation was input.

8. The system of claim 1, wherein change in position of said vehicle is computed incrementally.

9. The system of claim 1, wherein said sensor includes a global positional satellite (GPS) receiver.

10. The system of claim 1, wherein said vehicle is operable on land.

11. The system of claim 1, wherein said user-determined deviation from said desired path identifies a lateral offset from said desired path, such that said system directly maintains said vehicle on said desired path responsive to said lateral offset.

12. The system of claim 1, wherein said user-determined deviation from said desired path identifies a lateral offset from said desired path identifying a fractional width of said vehicle and enables one of a left lateral offset and a right lateral offset of said fractional width, such that said system directly maintains said vehicle on said desired path responsive to an accumulation of said lateral offset corresponding to a plurality of said user-determined deviation.

13. The system of claim 1, wherein the system receives a first user-determined deviation and subsequently receives a second discrete offset, wherein said second discrete offset results in a computation to maintain said vehicle on said desired path.

14. A system to directly control and maintain a farm vehicle on a desired predetermined path responsive to user-determined deviation therefrom, the system comprising:

a sensor to determine position of said farm vehicle as a function of time;

a controller including memory, functionally coupled to said sensor; said memory storing positional data defining said desired predetermined path, and further storing program instructions, executable by said controller, to compute any change in position of said vehicle and to compute any modifications in realtime to maintain said farm vehicle on said desired predetermined path responsive to any user-determined deviation;

means, coupled to said controller, for maintaining said farm vehicle on said desired predetermined path, responsive to any user-determined deviation, according to any change computed by said executable program; and means for enabling a user of said farm vehicle to input to said system said user determined deviation from said desired predetermined path, whereupon said system responds to said user-determined deviation from said desired path and maintains said vehicle according to said user-determined deviation.

15. The system of claim 14, wherein said task to be optimized includes irrigating an area whereon said desired predetermined path is defined.

16. The system of claim 14, wherein said memory further stores positional data including any deviation from said desired path traversed by said vehicle;

wherein positional data stored by said memory is useable to define a new predetermined desired path.

17. The system of claim 14, wherein said memory further stores positional data including any deviation from said desired path traversed by said vehicle;

wherein positional data stored by said memory defines a new predetermined desired path to be used in lieu of said predetermined desired path.

18. The system of claim 14, wherein said sensor includes a global positional satellite (GPS) receiver.

19. The system of claim 14, wherein the user-determined deviation is input to avoid an obstacle.

20. The system of claim 14, wherein the user-determined deviation is input to identify field discontinuities.

21. A system to directly maintain a vehicle on a desired path responsive to user-determined deviation therefrom, the system comprising:

means for sensing the position of said vehicle as a function of time;

means for controlling including memory, functionally coupled to said means for sensing; said memory storing positional data defining said desired path, and further storing program instructions, executable by said means for controlling, to compute any change in position of said vehicle and to compute any modifications in realtime to maintain said vehicle on said desired path responsive to any-user-determined deviation;

means, coupled to said means for controlling, for maintaining said vehicle according to any modifications computed by said executable program; and means for enabling a user of said vehicle to input to said system said user-determined deviation from said desired path, whereupon said system responds to said user-determined deviation from said desired path and controls and maintains said vehicle responsive to said user-determined deviation.

* * * * *

UNITED STATES PATENT AND TRADEMARK OFFICE
CERTIFICATE OF CORRECTION

PATENT NO. : 6,643,576 B1
DATED : November 4, 2003
INVENTOR(S) : Michael L. O'Connor et al.

It is certified that error appears in the above-identified patent and that said Letters Patent is hereby corrected as shown below:

Title page,
Item [75], Inventors, change "Michael L. O Connor," to -- Michael L. O'Connor --.

Column 6,
Line 60, change "to-input" to -- to input --.

Signed and Sealed this

Eleventh Day of May, 2004

JON W. DUDAS
*Acting Director of the United States Patent and Trademark Office*